United States Patent
Mayer et al.

(10) Patent No.: US 9,434,265 B2
(45) Date of Patent: Sep. 6, 2016

(54) MOTOR VEHICLE WITH PLUG-IN CHARGING DEVICE

(71) Applicant: MAN Truck & Bus AG, Munich (DE)

(72) Inventors: Florian Mayer, Munich (DE); Marcel Hessel, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 165 days.

(21) Appl. No.: 14/202,541

(22) Filed: Mar. 10, 2014

(65) Prior Publication Data

US 2014/0253035 A1   Sep. 11, 2014

(30) Foreign Application Priority Data

Mar. 11, 2013  (DE) .................. 10 2013 004 219

(51) Int. Cl.
| | |
|---|---|
| H02J 7/00 | (2006.01) |
| B60L 11/18 | (2006.01) |
| B60K 1/04 | (2006.01) |
| B60Q 1/50 | (2006.01) |
| B60L 1/14 | (2006.01) |
| B60L 3/00 | (2006.01) |

(Continued)

(52) U.S. Cl.
CPC .............. *B60L 11/1816* (2013.01); *B60K 1/04* (2013.01); *B60L 1/14* (2013.01); *B60L 3/0069* (2013.01); *B60L 11/126* (2013.01); *B60L 11/14* (2013.01); *B60L 11/1818* (2013.01); *B60L 11/1861* (2013.01); *B60Q 1/50* (2013.01); *B60L 2200/18* (2013.01); *B60L 2200/36* (2013.01); *B60L 2250/10* (2013.01); *B60L 2250/16* (2013.01); *B60Y 2200/14* (2013.01); *Y02T 10/6217* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 90/14* (2013.01)

(58) Field of Classification Search
CPC ............ B06L 11/1816; B60L 11/1818; B60L 11/1861; B60K 1/04; B60Q 1/50; B60Y 2200/14; Y02T 90/14
USPC ....................................................... 320/109
See application file for complete search history.

(56) References Cited

U.S. PATENT DOCUMENTS

| | | | |
|---|---|---|---|
| 4,619,615 A * | 10/1986 | Kratzenberg | ......... F41G 3/2655 340/518 |
| 5,934,918 A | 8/1999 | Wuechner | |
| 2008/0086260 A1* | 4/2008 | Lee | .................... G01C 21/3608 701/532 |

(Continued)

FOREIGN PATENT DOCUMENTS

| | | |
|---|---|---|
| DE | 10 2010 048384 A1 | 4/2012 |
| DE | 10 2012 007224 A1 | 11/2012 |

(Continued)

*Primary Examiner* — Vuthe Siek
(74) *Attorney, Agent, or Firm* — Lucas & Mercanti, LLP

(57) ABSTRACT

The invention relates to a motor vehicle having a storage device for storing electrical energy for an electric machine of the motor vehicle, a charging device having a charging interface for connecting a charging component for externally charging the storage device and a side bodywork section. The side bodywork section includes a vehicle door for opening and closing a person entry region which leads into a driver and/or passenger accommodating space of the motor vehicle. The charging interface is arranged in the lateral direction of the motor vehicle behind the side bodywork section, so that it can be protected by the side bodywork section against environmental influences and/or unauthorized access.

13 Claims, 3 Drawing Sheets

(51) Int. Cl.
  *B60L 11/12* (2006.01)
  *B60L 11/14* (2006.01)

(56) References Cited

U.S. PATENT DOCUMENTS

| | | | |
|---|---|---|---|
| 2009/0021221 A1* | 1/2009 | Krauer | B60L 11/1875 320/153 |
| 2009/0278491 A1 | 11/2009 | Grider | |
| 2010/0026238 A1* | 2/2010 | Suzuki | B60Q 3/06 320/109 |
| 2011/0227531 A1 | 9/2011 | Rajakaruna | |
| 2012/0083148 A1 | 4/2012 | Hirashita | |
| 2012/0268062 A1 | 10/2012 | Yoneda | |
| 2014/0042966 A1 | 2/2014 | Masuda | |

FOREIGN PATENT DOCUMENTS

| | | | |
|---|---|---|---|
| EP | 2 523 300 A1 | 11/2012 | |
| FR | 2 925 458 A3 | 6/2009 | |
| FR | 2 941 407 A1 | 7/2010 | |
| JP | 2008-D74971 * | 2/2008 | ............. G01C 21/00 |
| WO | 2012140729 A1 | 10/2012 | |

* cited by examiner

MOTOR VEHICLE WITH PLUG-IN CHARGING DEVICE

BACKGROUND OF THE INVENTION

The invention relates to a motor vehicle, preferably a utility vehicle, such as, for example, a truck or a bus. The motor vehicle is preferably a plug-in hybrid vehicle, an electric vehicle (for example a battery-operated vehicle), a range extender vehicle etc., in particular in the form of a utility vehicle.

Plug-in hybrid vehicles, for example, have an electric motor for driving the motor vehicle and a storage device for storing electrical energy for the electric motor. Plug-in hybrid vehicles are distinguished, in particular, by the fact that they have a charging device with a plug-in charging interface for connecting a charging cable for externally charging the storage device, for example, from an electrical power supply system. The charging devices are usually arranged on the outside of the bodywork of the motor vehicle in order to be easily accessible. A disadvantage with this is that the charging interfaces are usually exposed and are therefore not, or at least not sufficiently, protected against influences of the weather or unauthorized access.

BRIEF SUMMARY OF THE INVENTION

An object of the invention is to provide a motor vehicle with a plug-in charging device which is protected against influences of the weather and/or unauthorized access, but at the same time allows easy access when necessary.

This object can be achieved with the features of the main claim. Advantageous developments of the invention can be found in the dependent claims or the following description.

The invention provides a motor vehicle, preferably a utility vehicle, such as, for example, a truck or a bus. The motor vehicle comprises a storage device for storing electrical energy for an electric machine of the motor vehicle and a charging device having a charging interface (expediently a charging inlet, for example a charging socket) for connecting a charging cable or generally a charging component for expedient external charging of the storage device, for example, from an electrical power supply system. The charging interface is preferably embodied as a plug connection, with the result that the charging device constitutes a plug-in charging device. The motor vehicle also has a side bodywork section. The side bodywork section can preferably comprise one or more vehicle doors, for example for opening and closing a person entry region which leads into a driver and/or passenger accommodating space of the motor vehicle. The charging interface is expediently arranged in the lateral direction of the motor vehicle behind the side bodywork section, preferably in such a way that it can be protected by the side bodywork section against environmental influences and/or unauthorized access, but at the same time allows easy access when necessary.

In an embodiment of the present invention the charging device is installed in the entry region.

In particular, the charging device can be installed in the lateral direction of the motor vehicle behind a vehicle door. As a result, it is possible to use a vehicle door which is, as it were, already present to be able to protect, in the closed state, the charging device against influences of the weather and/or unauthorized access. At the same time, in the open state of the vehicle door easy access can be ensured to the charging device. The previously mentioned vehicle door can expediently be the first vehicle door in the longitudinal direction of the motor vehicle, or a vehicle door which is arranged behind it (for example the second, the third, the fourth or the fifth vehicle door).

In another embodiment of the invention the entry region has a step structure with at least one step. The charging device is preferably installed in, or at least adjacent to, the step structure. The step structure can have, for example, a step offset into which the charging device can be expediently installed. The step offset can be arranged, for example, behind, to the side of, underneath and/or above a step.

In a further embodiment of the present invention, the side bodywork section has a through-opening for the charging component. The through-opening preferably passes through the vehicle door at least in certain sections. In particular, the through-opening can comprise a gap between the vehicle door in the closed state and a step.

The through-opening is particularly embodied in such a way that the storage device can be charged via the charging component even when the vehicle door is closed.

The motor vehicle can additionally be equipped, for example, with a display device for visually communicating the state of charge of the storage device. The display device can comprise, for example, vehicle exterior lighting and/or vehicle interior lighting. The vehicle exterior lighting can comprise, in particular, a flashing indicator light device which serves to indicate the direction of travel, a front light (for example daytime running light, dipped headlight etc.) and/or a rear light (for example brake light, reversing light etc.). The display device can therefore use vehicle lighting which is used for another purpose or can be a lighting device which serves solely for communicating the state of charge of the storage device. The display device permits a driver to be able to receive information about the state of charge of the storage device from outside the motor vehicle, even, for example, from a large distance from the motor vehicle.

The means of detecting the state of charge can, however, also be arranged in the dashboard, on the charging device itself, on the storage device or at some other location inside the motor vehicle in order to be expediently detected from inside the motor vehicle.

The electric machine is preferably an electric motor for driving the motor vehicle alone at least at certain times, or at least assisting the driving. The charging component is preferably a charging cable.

The motor vehicle is, in particular, a plug-in hybrid vehicle, an electric vehicle (for example a battery-operated vehicle), a range extender vehicle etc., preferably in the form of a utility vehicle.

The preferred embodiments of the invention described above can be combined with one another in any desired way. Other advantageous developments of the invention are disclosed in the dependent claims or result from the following description of preferred embodiments of the invention in conjunction with the appended figures.

DETAILED DESCRIPTION OF THE INVENTION

Figure 1:
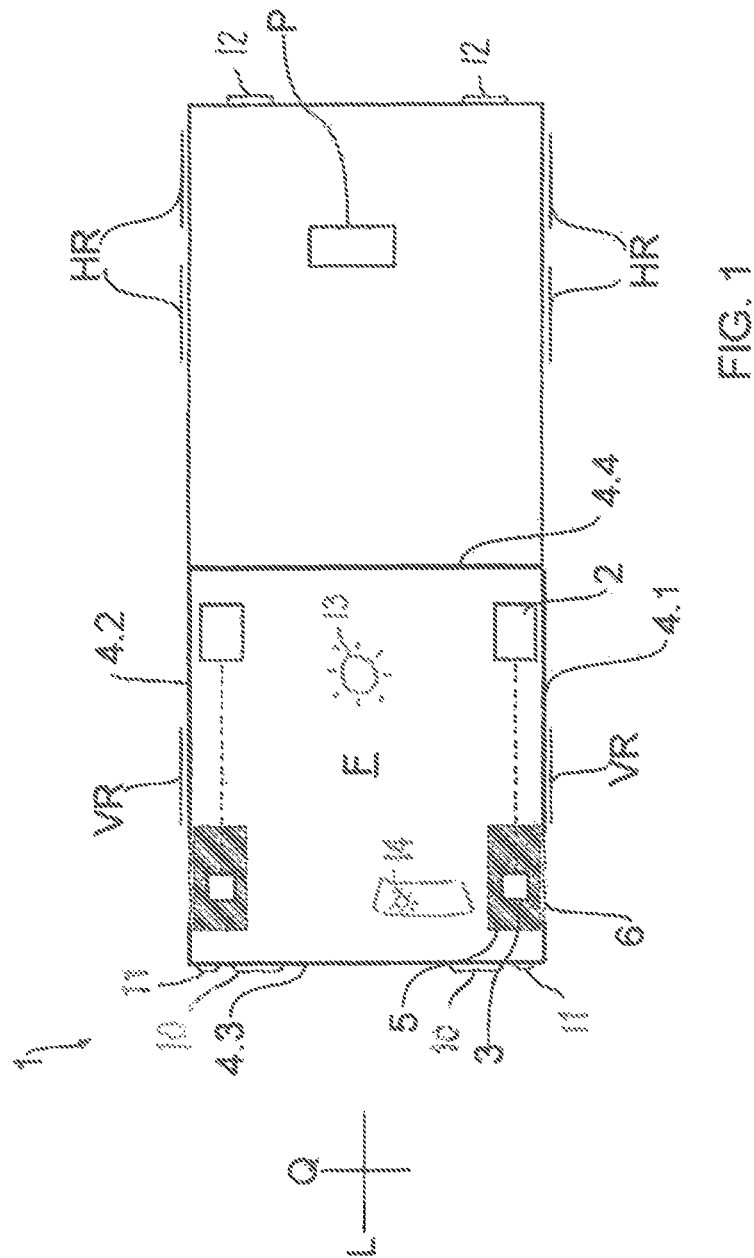
FIG. 1 is a plan view of a motor vehicle which is illustrated in a highly schematic fashion, according to an embodiment of the invention.

FIG. 1 shows a plan view of a motor vehicle 1 which is illustrated in a highly schematic fashion, according to an embodiment of the invention. The motor vehicle 1 is illustrated purely by way of example as a semi-trailer tractor which firstly has in a customary way a driver and passenger accommodating space F (for example a driver's cab), a fifth wheel coupling P for coupling a semi-trailer, two front wheels VR and, for example, a rear double axle unit comprising four wheels HR. The reference symbol L characterizes the longitudinal direction of the motor vehicle 1, while the reference symbol Q characterizes the lateral direction of the motor vehicle 1. Within the scope of the invention, the motor vehicle 1 can also be another type of truck, a bus or generally another motor vehicle.

The motor vehicle 1 comprises a storage device 2 for storing electrical energy for an electric motor (not shown) for driving the motor vehicle 1. In addition, the motor vehicle 1 preferably has an internal combustion engine (not shown) for driving it, with the result that the motor vehicle 1 can form a hybrid vehicle.

The motor vehicle 1 additionally comprises a charging device 3 having a charging interface, for example a plug connection, for connecting a charging component, in particular a charging cable, via which the storage device 2 can be charged externally, for example from a power supply system. The motor vehicle 1 therefore constitutes what is referred to as a plug-in hybrid vehicle. However, the motor vehicle 1 can also be for example a quasi-pure electric vehicle or a range extender vehicle.

Furthermore, the motor vehicle 1 has vehicle bodywork which firstly bounds the driver and passenger accommodating space F in a customary way. The vehicle bodywork comprises a driver-side side bodywork section 4.1, a co-driver-side side bodywork section 4.2, a front bodywork section 4.3, a rear bodywork section 4.4 and additionally a roof bodywork section (not shown). The driver-side side bodywork section 4.1 comprises a vehicle door 6 by means of which a person entry region 5, which leads into the driver and passenger accommodating space F, can be opened and closed.

One particular feature of the motor vehicle 1 is that the charging interface of the charging device 3 is arranged in the lateral direction Q behind the side bodywork section 4.1, in particular behind the vehicle door 6 in the entry region 5, in order as a result to be protected against environmental influences or unauthorized access.

Figure 2:
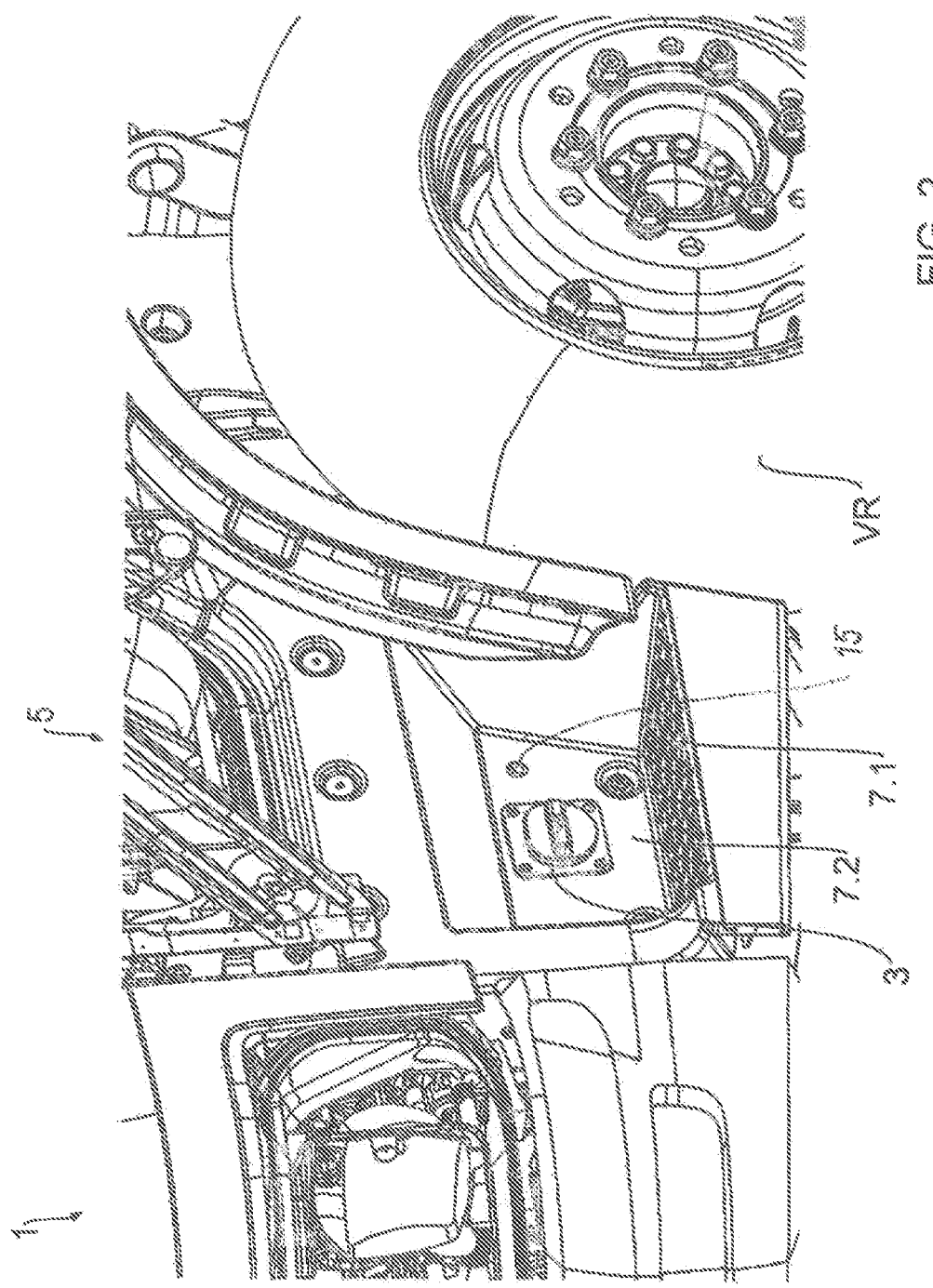
FIG. 2 is a perspective view of part of the motor vehicle from FIG. 1, but with the vehicle door omitted for the sake of clarity.

FIG. 2 shows a perspective view of part of the motor vehicle 1 from FIG. 1, but with the vehicle door 6 omitted for reasons of clarity. FIG. 2 shows that the entry region 5 comprises a step structure with at least one step 7.1 and a step offset 7.2 formed above and behind the step 7.1. The charging device 3 is installed in the step structure, to be precise in particular in the step offset 7.2.

Figure 3:
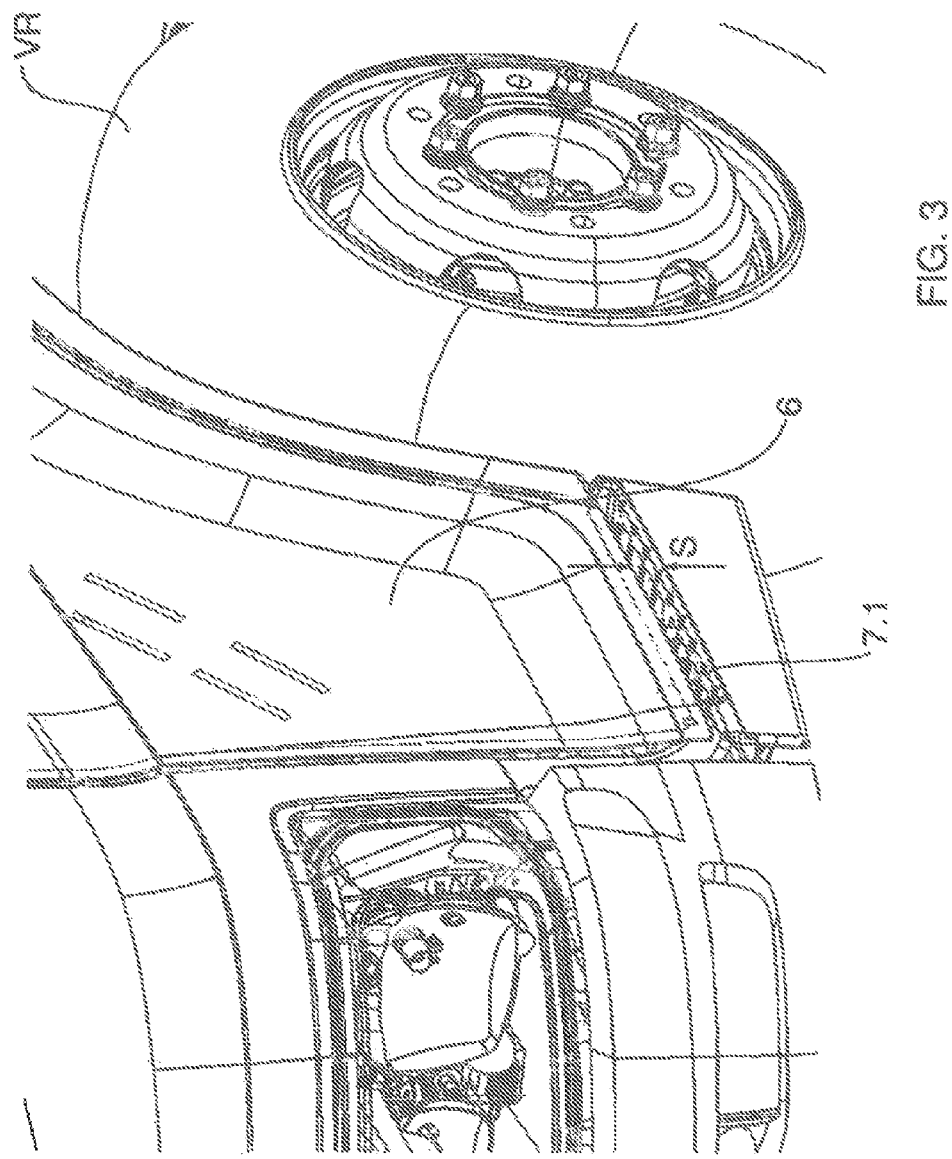
FIG. 3 is a perspective view of part of the motor vehicle from FIG. 2 with the vehicle door closed.

FIG. 3 shows a perspective view of part of the motor vehicle 1 from FIGS. 1 and 2 with the vehicle door 6 in the closed state. FIG. 3 shows a gap S between the step 7.1 and the vehicle door 6. The gap S is dimensioned in such a way that even when the vehicle door 6 is closed a charging cable can be led through the gap S to the charging interface in order to charge the storage device 2. However, within the scope of the invention it is also possible to make available another through-opening for the charging cable, which through-opening is expediently bounded by the vehicle door 6 at least in certain sections.

The motor vehicle 1 is additionally equipped with a display device for visually communicating the state of charge of the storage device 2. The display device can comprise vehicle lighting which is usually already necessary in the motor vehicle 1 in any case, for example a front light 10, 11, a rear light 12 (for example daytime running light, dipped headlight, brake light, flashing direction indicator light, reversing light etc.) and/or a passenger compartment light 13. It is alternatively or additionally possible to arrange the display device for examples as a light 14 in the dashboard, a light 15 (FIG. 2) in the charging device 3 itself or at some other suitable location in the motor vehicle 1.

It is to be noted that within the scope of the invention the charging device 3 can also be arranged in the lateral direction Q of the motor vehicle 1 behind the co-driver-side side bodywork section 4.2. In addition it is to be noted that the motor vehicle 1 is not limited to a semi-trailer tractor but also comprises, for example, buses and other types of trucks.

The invention is not limited to the preferred embodiments described above. Instead, a multiplicity of variants and refinements are possible which also make use of the inventive idea and are therefore included in the scope of protection. Furthermore, the invention also claims protection for the subject matter and the features of the dependent claims independently of the features and claims referred to.

The invention claimed is:

1. A motor vehicle, comprising:
   a storage device storing electrical energy for an electric machine of the motor vehicle;
   a charging device having a charging interface for connecting the charging device to an external power source for charging the storage device; and
   a side bodywork section comprising a vehicle door for opening and closing a person entry region of the motor vehicle, the person entry region leading into a driver accommodating space or a passenger accommodating space of the motor vehicle,
   the charging interface arranged in a lateral direction of the motor vehicle behind the side bodywork section, whereby the charging interface is protected against environmental influences and unauthorized access,
   wherein the person entry region has a step structure with at least one step facilitating entry of a person into the driver accommodating space or the passenger accommodating space, the step structure has a step offset, and the charging device is installed in the step offset.

2. The motor vehicle of claim 1, wherein the charging device is installed in the entry region.

3. The motor vehicle of claim 1, wherein the charging device is installed in the lateral direction behind the vehicle door.

4. The motor vehicle of claim 1, wherein the side bodywork section has a through-opening for the charging component.

5. The motor vehicle of claim 4, wherein the through-opening passes through the vehicle door at least in certain sections.

6. The motor vehicle of claim 4, wherein the through opening comprises a gap between a bottom edge of the vehicle door and a step in the person entry region, in a closed state of the vehicle door.

7. The motor vehicle of claim 4, wherein the through-opening permits charging of the storage device when the vehicle door is closed.

8. The motor vehicle of claim 1, wherein the vehicle has a display device for visually communicating a state of charge of the storage device.

9. The motor vehicle of claim 8, wherein the display device comprises at least one of vehicle exterior lighting and vehicle interior lighting.

10. The motor vehicle of claim 8, wherein the display device comprises a vehicle exterior lighting including at least one of a flashing indicator light device that serves to indicate a direction of travel, a front light, and a rear light of the motor vehicle.

11. The motor vehicle of claim 8, wherein the display device is installed in a dashboard or on the charging device itself.

12. The motor vehicle of claim 1, wherein the electric machine is an electric motor for driving the motor vehicle.

13. The motor vehicle of claim 1, wherein the motor vehicle is one of an electric vehicle, a battery-operated vehicle, a range extender vehicle, and a plug-in hybrid vehicle.

\* \* \* \* \*